United States Patent Office 3,809,680
Patented May 7, 1974

3,809,680
RESINOUS FORMALDEHYDE REACTION PRODUCT OF VULCANIZED-SCRAP-RUBBER PYROLYSIS OIL AND ITS PRODUCTION
Lynn B. Wakefield, Akron, Ohio, assignor to The Firestone Tire & Rubber Company, Akron, Ohio
No Drawing. Filed Mar. 20, 1972, Ser. No. 236,438
Int. Cl. C08g 5/00, 7/00
U.S. Cl. 260—51 R    4 Claims

ABSTRACT OF THE DISCLOSURE

The invention relates to a hard resin prepared by the reaction of formaldehyde and pyrolysis oil obtained by the destructive distillation of scrap rubber vulcanizate, and its preparation. The resins are useful as tackifiers to be used in elastomers.

---

The invention relates to the reaction of formaldehyde or other aliphatic aldehyde with oil obtained from the pyrolysis of vulcanized scrap rubber; a hard, solid resin is obtained. It may be used as a tackifier in the compounding of natural and synthetic rubbers.

The composition of scrap rubbers varies considerably, but the principal variation is in the mineral components of the scrap, rather than in the elastomers contained in the scrap. There are several elastomers used widely in rubbers, namely, natural rubber, polyisoprene, polybutadiene, butadiene-styrene copolymer, butadiene-acrylonitrile copolymer and ethylene-propylene rubber copolymers. Minor amounts of other elastomers, such as butyl rubber and neoprene, are contained in many scraps, but the percentage normally is low. During the distillation of the scrap the mineral matter remains as a residue and, of course, some of the elastomer is charred, but a high percentage of oil distillate is obtained.

The distillate is derived from the elastomer present and from oil that may be present in the scrap that is distilled. This may be aliphatic, aromatic or naphthenic. The composition of the distillate will vary with the temperature at which the pyrolysis is carried out. Usually the pyrolysis temperature will be between 1000 and 2500° F., but may be somewhat higher. At the higher pyrolysis temperatures the tendency is for the aromatic content of the distillate to be increased. There is little or no oil in many rubber compounds, but in other rubber compounds the oil content may run as high as 25 percent. In the ordinary pyrolysis oil, the oil derived from that oil which has been compounded with the rubber before vulcanization, will be substantial.

The Bureau of Mines Report of Investigation 7302, "Destructive Distillation of Scrap Rubbers," September 1969, gives the following analysis of oils distilled at different temperatures.

ANALYSES OF DISTILLATE OIL

| | Calcination temperature, ° C. | |
|---|---|---|
| | 500 | 900 |
| Volume, percent: | | |
| Acids | 1.6 | 5.5 |
| Bases | 2.2 | 1.2 |
| Neutral oil | 56.6 | 63.2 |
| Neutral oil analyses volume, percent: | | |
| Olefins | 15.5 | 13.0 |
| Aromatics | 51.5 | 84.8 |
| Paraffins and naphthenes | 33.0 | 2.2 |

There is a high percentage of neutral oil in the distillate and a small amount of acids and bases. The analysis shows that there is a high percentage of aromatics present. The aldehyde treatment which will be described will tend to condense the aromatics as well as react with the olefins and possibly with the naphthenes. The Bureau of Mines Report also gives a Mass Spectrometric analysis of the oil obtained by the destructive distillation of vulcanized scrap rubber as follows:

MASS SPECTROMETRIC ANALYSIS OF OIL

| | Calcination temperature, ° C. | |
|---|---|---|
| | 500 | 900 |
| Volume, percent: | | |
| Alkyl benzenes | 19.0 | 20.5 |
| Phenols | 1.0 | 0.9 |
| 3-ring aromatics | 1.5 | 2.4 |
| Biphenyl and acenaphthene | 6.1 | 8.5 |
| Alkyl naphthalenes | 8.9 | 29.7 |
| Indenes | 6.8 | 8.5 |
| Styrene | 2.0 | 4.5 |
| Alkylstyrenes and indans | 11.2 | 5.8 |

The aldehyde reacts with the various compounds.

The treatment of phenol-containing oils has been disclosed in U.S. Pats. 2,382,184, 2,395,739, 2,713,571, 2,477,538, and 2,397,398 and an article by H. Wegler in Angew. Chem. A/60, Jahrg, 1948/Nr. 4, pp. 88–96 and articles by M. Imoto et al. in Makromol. Chem., 43, 189–219 (1948); 59, 222–232 (1963).

Thus, it has been known that some aromatic hydrocarbons, including m-xylene, anthracene and acenaphthene react with formaldehyde and other aldehydes under the influence of an acidic catalyst to form alkylol-aromatic compounds which may be further reacted with organic acids to produce resins used in the paint and rubber industries.

It is known that oil derived from the pyrolysis of different rubbers varies in its content of chemicals which react with formaldehyde and other aldehydes to produce a solid resin. Their presence are included to the extent of 95% or higher in the resin (based on the weight of the aldehyde-resin reaction product). Commercially, pyrolysis oils which yield at least 50% of a such solid resin are preferred for use in the process of this invention. Such oils include pyrolysis oils derived from scrap, vulcanized mechanical goods, scrap tires, etc.

The preferred aldehyde for commercial operations is formaldehyde or a formaldehyde "generator" such as paraformaldehyde, but other aldehydes may be used, such as acetaldehyde, propionaldehyde, etc. Generally, aldehydes described by the general formula $C_nH_{2n}O$ where $n$ may vary from 1 to 20 can be used.

Based on the foregoing, and considering the variation in the compositions of the scrap rubbers and the effect of the calcination temperature on the pyrolysis oil, the oil of this invention covers more generally oils having the following analysis in percentages by volume.

| | Percent |
|---|---|
| Alkyl benzenes | 15–25 |
| Phenols | 0.1–5 |
| 3-ring aromatics | 0.1–5 |
| Biphenyl and acenaphthene | 5–25 |
| Alkyl naphthalenes | 5–35 |
| Indenes | 1–20 |
| Styrene | 1–15 |
| Alkylstyrenes and indans | 1–25 |

The reactions of formaldehyde with a wide variety of aliphatic and aromatic compounds are known. The invention relates to the reaction of formaldehyde or other aldehyde with a plurality of the pyrolysis oil compounds to produce a valuable hard resin, the analysis of which will vary from resin to resin, but the composition of the pyrolysis oil does not vary so much as to produce a wide variance in the properties of the resins that are obtained.

Commercially, a Friedel-Crafts catalyst is used which is known to speed alkylation reactions. Such catalysts include boron trifluoride complexes such as the alkyl ethers, hydrate, phenolate, etc.; zinc chloride, etc.

The reactions of this invention catalyzed by commercial catalysts react at a low temperature of the order of −25° C. However, this reaction is slow and higher temperatures are preferred; for example, from ambient temperatures to 250° C. The reaction may be carried out in any suitable reaction vessel on either a batch or continuous basis.

The following is illustrative of the formaldehyde treatment of an oil obtained from vulcanized scrap rubber pyrolysis. The oil used is representative of what would be obtained in commercial production from a usual vulcanized scrap rubber at any usual pyrolysis temperature, the pyrolysis being carried out in the substantial absence of air.

PREPARATION OF RESIN

Tire pyrolyzate oil (100 parts by weight) is placed in a vessel with 20 parts of paraformaldehyde and 50 parts of toluene as a diluent. The contents of the vessel are stirred and cooled to −10° C., and 5 parts by volume of boron trifluoride ethyl ether complex is slowly added as a catalyst. No visible reaction occurs at this temperature, but as the mixture warms to room temperature, a sticky granular solid forms on the walls and agitator blades. The amount of this solid increases as the temperature rises; finally, heat is applied to make the mixture reflux. After boiling an hour, the reaction is stopped and the liquid poured out; the solid matter remaining in the vessel is dissolved in a small amount of methyl ethyl ketone, and the extracts combined before washing with 30% NaOH solution, and once with an equal volume of a saturated salt brine.

This was a laboratory procedure used to neutralize any acidic materials derived from the catalysts as well as the small amount of acidic materials contained in the pyrolysis oil. On a commercial scale, the volume of NaOH solution and strength would probably be changed so that the neutralization could be effected in an efficient and economic manner.

All volatile matter in the washed solution is removed by vacuum distillation to a boiling point of 200° C. at 3 mm. pressure. The hot residue is poured off and allowed to cool and harden. In one run, the weight of the product (a hard, brittle resin) was 77 g., or a yield of 64% based on the combined starting weights of oil and formaldehyde; in others, the yields varied from 51 to about 70%.

If the oil, without any treatment or reaction, is vacuum distilled to a similar endpoint, the residue is a soft paste, and the yield is about 28%; if catalyst is added but no formaldehyde, then the yield of hard resin is only about 40%.

The example is illustrative of the treatment of pyrolysis oil with formaldehyde. The reaction was carried out at a low temperature, but higher temperatures may be employed to speed up the reaction, which would be desirable in a commercial operation.

The separation of the hard resin from the aqueous, oily diluent mixture obtained in the reaction may be effected in any suitable manner. For example, the reaction mixture may be steam distilled to separate the diluent from the hardenable resin composition. Any suitable means for preventing the hard residue from forming on the interior of the vessel and the agitator may be utilized, such as a reactor provided with surface scrapers. The reaction may be carried out on a batch basis or as a continuous reaction.

The utility of the hard resin for use as a rubber tackifier is illustrated in the following table, in which a commercial resin known as Piccopale 100 (a product of Pennsylvania Industrial Chemicals Corporation) is used as the control. From 0.1 to 25 parts of the resin per 100 parts of elastomer will be used.

COMPARATIVE EVALUATION OF RESIN

| Resin | Control | A | B | C |
|---|---|---|---|---|
| Monsanto rheometer at 300° F. 3° arc. 900 r.p.m.: | | | | |
| Scorch time, min | 10.8 | 8.6 | 8.1 | 7.8 |
| Opt. cure, min | 18.0 | 14.8 | 10.3 | 14.8 |
| Normal stress-strain—cured at 300° F.: | | | | |
| 300% modulus, p.s.i.: | | | | |
| 15' | 2,420 | 2,220 | 2,000 | 2,120 |
| 23' | | 2,300 | 1,950 | 2,225 |
| 30' | | 2,275 | 2,000 | 2,200 |
| Tensile strength, p.s.i.: | | | | |
| 15' | 2,570 | 2,440 | 2,180 | 2,350 |
| 23' | 2,520 | 2,350 | 2,020 | 2,270 |
| 30' | 2,570 | 2,350 | 2,120 | 2,270 |
| Ultimate elongation, percent: | | | | |
| 15' | 335 | 360 | 325 | 355 |
| 23' | 280 | 300 | 315 | 315 |
| 30' | 270 | 315 | 325 | 320 |
| Aged stress-strain—aged 2 days at 212° F.—Cured 23' at 300° F.: | | | | |
| 300% modulus, p.s.i. | | | | |
| Tensile strength, p.s.i. | 1,625 | 1,900 | 1,400 | 1,950 |
| Ultimate elongation, percent | 130 | 170 | 190 | 230 |

EVALUATION OF SEVERAL RESINS FROM TIRE PYROLYZATE OIL

| Resin | Control | A | B | C |
|---|---|---|---|---|
| Firestone flexometer test—cured 35' at 300° F.: | | | | |
| Shore "A" at— | | | | |
| 73° F | 65 | 65 | 68 | 71 |
| Temp | 61 | 62 | 60 | 61 |
| Deflection, percent | 15.3 | 14.7 | 14.0 | 11.3 |
| Running temp., ° F | 222 | 227 | 258 | 263 |
| Wind-up tack: | | | | |
| X vs. X lbs./in | 4.6 | 3.4 | 5.4 | 6.6 |
| O vs. O lbs./in | 6.6 | 4.2 | 7.8 | 8.8 |
| Average lbs./in | 5.6 | 3.8 | 6.6 | 7.7 |
| Instron green stress-strain: | | | | |
| Initial, lbs | 3.2 | 3.1 | 3.6 | 3.5 |
| Peak, lbs | 3.2 | 3.1 | 3.6 | 3.5 |
| Break, lbs | .4 | .4 | .6 | .8 |
| Percent elongation | 570 | 715 | 620 | 790 |
| Instron green stress degradation: | | | | |
| 200%, p.s.i | 30 | 26 | 34 | 34 |
| 200%, integrator | 702 | 668 | 844 | 802 |
| 4 min., p.s.i | 9 | 8 | 10 | 10 |
| 4 min., integrator | 2,450 | 2,174 | 2,858 | 2,785 |

The resins were compounded in a butadiene-styrene rubber copolymer/natural rubber recipe containing a usual amount of carbon black, oil, zinc oxide, stearic acid, sulfur and accelerator. Each compound contained 17 parts per 100 of rubber of its resin. The table compares the properties of the cured compositions in which the resins are identified as follows:

Resin A was obtained from scrap rubber pyrolysis oil treated with boron trifluoride ether complex in the manner illustrated in the foregoing example. The product was caustic washed and vacuum devolatilized to 180° C. at 3 mm. pressure. This resin was obtained without reaction with formaldehyde.

Resin B.—This resin was obtained in the same manner as resin A, except that 100 parts of the oil were reacted with 20 parts of paraformaldehyde in a manner such as illustrated in the foregoing example.

Resin C.—This resin was obtained in the same manner as resin B, except that the reaction was conducted at 80° C. under pressure.

The foregoing data shows the scorch times from the composition containing the resins of this invention were a little less than for the control but are considered acceptable commercially.

The data on the 300% modulus of compositions containing the Piccopale 100 and cured 23 and 30 minutes is not available. The tensile strengths for the compositions containing the resins of this invention were somewhat inferior to the control, but acceptable. Based on the elongation data, the states of cure of all samples were essentially equivalent.

Based on the aged stress-strain data summarized in the table, the vulcanizates obtained with the resins of this invention had good aging properties. The "running temperature" data obtained with the Firestone Flexometer shows somewhat inferior properties for the pyrolysis oil resin vulcanizates, but the products have commercial value.

The use of less of the commercial resins as compared with the given amount of the control, would show more nearly equivalent results.

The "wind-up tack" values of the Compounds B and C are somewhat superior to the control and Compound A. These results indicate that the pyrolysis oil/formaldehyde resins will improve the tack of compounded rubber which significantly improves the precessing of the compound in the manufacture of rubber articles particularly in the manufacture of pneumatic tires.

The Instron Green Stress-Strain data on Compounds B and C are also superior to the control and Compound A results. A higher numerical value is desired and reflects a greater "green strength" in the compound. Compounds with greater "green strength" have less tendency to fall apart in factory processing; that is, the compounds have greater dimensional stability.

The resins of the present invention indicated slight staining of the sidewall stocks, but this may be overcome by further experimentation.

I claim:

1. A resin which is a solid reaction product obtained from the reaction of substantially 20 parts of an aliphatic aldehyde having the formula $C_nH_{2n}O$ in which $n$ is 1 to 20 with 100 parts of oil obtained by the destructive distillation of vulcanized-scrap-rubber at substantially 1000° to 2500° F. under sufficient pressure to prevent substantial loss of reactant, which oil has the following analysis (volume percent):

| | Percent |
|---|---|
| Alkenyl benzenes | 15–25 |
| Phenols | 0.1–5 |
| 3-ring aromatics | 0.1–5 |
| Biphenyl and acenaphthene | 5–25 |
| Alkyl naphthalenes | 5–35 |
| Indenes | 1–20 |
| Styrene | 1–15 |
| Alkylstyrenes and indans | 1–25 |

2. The resin of claim 1 which is a formaldehyde reaction product.

3. The process of producing a resin which comprises reacting at a temperature between −25° C. and 250° C. in the presence of an alkylation catalyst (1) substantially 20 parts of an aliphatic aldehyde having the formula $C_nH_{2n}O$ in which $n$ is 1 to 20 and (2) 100 parts of oil obtained from the destructive distillation of vulcanized-scrap-rubber at substantially 1000° to 2500° F. under sufficient pressure to prevent substantial loss of reactant, obtaining a solid reaction product in a liquid from said catalytic reaction, and separating the solid from the liquid; the oil having the following analysis (volume percent):

| | Percent |
|---|---|
| Alkenyl benzenes | 15–25 |
| Phenols | 0.1–5 |
| 3-ring aromatics | 0.1–5 |
| Biphenyl and acenaphthene | 5–25 |
| Alkyl naphthalenes | 5–35 |
| Indenes | 1–20 |
| Styrene | 1–15 |
| Alkylstyrenes and indans | 1–25 |

4. The process of claim 1 in which the aldehyde is formaldehyde.

References Cited
UNITED STATES PATENTS

| 1,986,050 | 1/1935 | Fairley | 260—720 |
| 2,871,205 | 1/1959 | Mankowich et al. | 260—710 |

MURRAY TILLMAN, Primary Examiner

J. ZIEGLER, Assistant Examiner

U.S. Cl. X.R.

260—53 R, 57 R, 62, 67 RUA.A, 73 R, 710, 720